United States Patent [19]

Roman et al.

[11] Patent Number: 4,542,010

[45] Date of Patent: Sep. 17, 1985

[54] METHOD AND APPARATUS FOR PRODUCING OXYGEN AND NITROGEN AND MEMBRANE THEREFOR

[75] Inventors: Ian C. Roman; Richard W. Baker, both of Bend, Oreg.

[73] Assignee: Bend Research, Inc., Bend, Oreg.

[21] Appl. No.: 393,712

[22] Filed: Jun. 30, 1982

[51] Int. Cl.⁴ ............................................ C01B 13/02
[52] U.S. Cl. ........................................ 423/579; 55/16; 55/68; 55/158; 422/122; 422/177; 422/211; 423/219; 436/178
[58] Field of Search ................. 55/16, 158, 68; 423/579, 219; 422/122, 177, 211; 436/178

[56] References Cited

U.S. PATENT DOCUMENTS

| | | | |
|---|---|---|---|
| 2,388,095 | 10/1945 | Stahly | 55/16 |
| 2,824,620 | 2/1958 | De Rosset | 55/16 |
| 2,892,508 | 6/1959 | Kohman et al. | 55/16 |
| 2,966,235 | 12/1960 | Kammermeyer | 55/16 |
| 3,274,750 | 9/1966 | Robb | 55/16 |
| 3,396,510 | 8/1968 | Ward et al. | 55/16 |
| 3,510,387 | 5/1970 | Robb | 55/16 |
| 3,611,676 | 10/1971 | Christen et al. | 55/16 |
| 4,032,617 | 6/1977 | Gay | 423/219 |
| 4,104,037 | 8/1978 | Garrett et al. | 55/16 |
| 4,180,388 | 12/1979 | Graham et al. | 55/158 |

FOREIGN PATENT DOCUMENTS

| | | |
|---|---|---|
| 83303743.5 | of 0000 | European Pat. Off. |
| 83303741.9 | of 0000 | European Pat. Off. |
| 48246 | 5/1981 | Japan ................. 55/16 |
| 48244 | 5/1981 | Japan ................. 55/16 |
| 48243 | 5/1981 | Japan ................. 55/16 |

OTHER PUBLICATIONS

Scholander, *Science*, 131, 585, (1960).
Bassett & Schultz, Non-equilibrium facilitated diffusion of oxygen through membranes of aqueous cobaltodihistidine, *Biochim. Biophys. Acta.*, 211, 194, (1970).
Parrett; Membranes succeed by separating, *Technology*, Mar./Apr. 1981, p. 16.
*J. Am. Chem. Soc.*, 102, 3285, (1980).
*J. Am. Chem. Soc.*, 103, 1236, (1981).
*J. Am. Chem. Soc.*, 101, 1622, (1979).
*J. Am. Chem. Soc.*, 102, 3283, (1980).
European Patent Office, How to Get a European Patent–Guide for Applicants, paragraph 77.

*Primary Examiner*—John Doll
*Assistant Examiner*—Wayne A. Lange
*Attorney, Agent, or Firm*—Chernoff, Vilhauer, McClung, Birdwell & Stenzel

[57] ABSTRACT

Process and apparatus for the separation and purification of oxygen and nitrogen as well as a novel membrane useful therein are disclosed. The process utilizes novel facilitated transport membranes to selectively transport oxygen from one gaseous stream to another, leaving nitrogen as a byproduct. In the method, an oxygen carrier capable of reversibly binding molecular oxygen is dissolved in a polar organic membrane which separates a gaseous feed stream such as atmospheric air and a gaseous product stream. The feed stream is maintained at a sufficiently high oxygen pressure to keep the oxygen carrier in its oxygenated form at the interface of the feed stream with the membrane, while the product stream is maintained at a sufficiently low oxygen pressure to keep the carrier in its deoxygenated form at the interface of the product stream with the membrane. In an alternate mode of operation, the feed stream is maintained at a sufficiently low temperature and high oxygen pressure to keep the oxygen carrier in its oxygenated form at the interface of the feed stream with the membrane and the product stream is maintained at a sufficiently high temperature to keep the carrier in its deoxygenated form at the interface of the product stream with the membrane. Under such conditions, the carrier acts as a shuttle, picking up oxygen at the feed side of the membrane, diffusing across the membrane as the oxygenated complex, releasing oxygen to the product stream, and then diffusing back to the feed side to repeat the process. Exceptionally and unexpectedly high $O_2/N_2$ selectivity, on the order of 10 to 30, is obtained, as well as exceptionally high oxygen permeability, on the order of 6 to $15 \times 10^{-8}$ cm³-cm/cm²-sec-cmHg, as well as a long membrane life of in excess of 3 months, making the process commercially feasible.

36 Claims, 2 Drawing Figures

METHOD AND APPARATUS FOR PRODUCING OXYGEN AND NITROGEN AND MEMBRANE THEREFOR

The government has rights in this invention pursuant to Contract No. DE-AC06-79ER10337 awarded by the U.S. Department of Energy.

BACKGROUND OF THE INVENTION

Oxygen and nitrogen are among the most widely used chemicals in the world, the annual consumption of each gas amounting to in excess of 20 million tons in the United States. Most of this oxygen is used in the steel industry and related metals manufacturing processes. Oxygen-enriched air has also found significant uses, including treatment of waste water, non-ferrous smelting, glass production, medical applications, and other chemical oxidation processes. In addition, there is a great potential market for oxygen-enriched air in the synthetic fuels industry. Nitrogen and nitrogen-enriched air are useful primarily for inert blanketing atmospheres and for refrigeration.

More than 99% of all oxygen and nitrogen is currently produced by cryogenic fractionation, or a process involving lowering the temperature of air sufficiently (to about $-215°$ C.) to liquefy it and then using a multistage distillation process to produce pure oxygen and pure nitrogen. A major drawback of such cryogenic processes is that they require a great deal of energy and consequently are very expensive.

An alternate method that has been investigated for producing oxygen-enriched air involves selective permeation through polymeric membranes. Membranes are attractive for gas separations because of their low energy requirements and inherent selectivity. (Oxygen-to-nitrogen selectivity is defined as the ratio of oxygen permeability to nitrogen permeability.) However, because oxygen and nitrogen are such similar molecules, selectivities for oxygen over nitrogen are low with all polymeric membranes, usually between 1.5 and 4. See, for example, Hwang et al., *Separation Science* 9 (1974) 461. In addition, the most selective membranes have the lowest oxygen permeabilities. The most promising polymeric membrane has been silicone rubber, which has a selectivity of about 2 and an oxygen permeability of about $6 \times 10^{-8}$ cm$^3$-cm/cm$^2$-sec-cmHg. This is the highest oxygen permeability of any polymeric membrane, but the maximum oxygen content of the gas produced from air is only about 35% regardless of the operating conditions. For this reason, polymeric membranes for the separation of oxygen and nitrogen have never been commercially successful.

A number of successful facilitated-transport methods are known for separating specific gases from gaseous mixtures by use of a complexing agent in a liquid membrane. See, for example, U.S. Pat. Nos. 3,844,735, 3,864,418, 3,865,890 and 4,239,506, all of which are directed to facilitated transport methods of separating ethylene from mixtures of methane and ethane. See also U.S. Pat. Nos. 3,396,510, 3,503,186 and 3,823,529, directed to similar methods for the separation of carbon dioxide, sulfur dioxide and carbon monoxide. Although the '510 patent to Ward et al. discloses the possibility of facilitated transport of oxygen, the proposed system is strictly an aqueous-based one, utilizing water-soluble complexing agents, and it was found to be commercially unfeasible.

It was observed by Tsumaki over forty years ago in *Bull. Chem. Soc. Japan* 13 (1938) 252 that synthetic chelate-type compounds reversibly bind oxygen. However, attempts to formulate a commercially feasible process for the production of oxygen- and nitrogen-enriched air using a membrane process have been unsuccessful to date.

The first demonstration of facilitated transport of oxygen across a membrane, using hemoglobin as the oxygen carrier, was reported by Scholander in *Science* 131 (1960) 585. The method reported was completely impractical, however, since hemoglobin is a protein which is easily denatured and not stable outside of the human body for longer than a few minutes. Moreover, hemoglobin is a very large molecule with consequent low diffusivity, which necessarily results in very low rates of transport of oxygen across the membrane.

In their pioneering study relating to facilitated transport of oxygen across a membrane, Bassett and Schultz reported selective transport of oxygen with the use of cobaltodihistidine as a complexing agent in an aqueous system in *Biochim. Biophys. Acta* 211 (1970) 194. However, the oxygen-to-nitrogen selectivity was only about 4, which did not represent an improvement over even polymeric membranes, and the liquid-membrane carrier system rapidly degraded, requiring the preparation of a fresh membrane for each separation. In addition, these membranes exhibited low oxygen permeabilities—less than that of silicone rubber membranes. Thus, this method also was impractical for the separation of oxygen and nitrogen from air.

It is therefore a principal object of this invention to provide a commercially feasible non-cryogenic process and apparatus for the separation of oxygen from atmospheric air or other oxygen-containing gaseous streams.

It is another principal object of this invention to provide a commercially feasible non-cryogenic process and apparatus for the separation of oxygen and nitrogen from atmospheric air.

It is still another object of this invention to provide a novel membrane useful for the separation of oxygen and nitrogen from atmospheric air.

These and other objects are accomplished by the method and apparatus and novel membrane of the present invention, which are summarized and particularly described below.

SUMMARY OF THE INVENTION

According to one embodiment of the present invention, oxygen is selectively separated from atmospheric air or other oxygen-containing gaseous stream (feed stream) by a facilitated-transport process schematically shown in FIG. 1 comprising (a) bringing the feed stream into contact with a novel membrane comprising a membrane support which contains a solvent or combination of solvents, an "axial base," and an oxygen carrier comprising a metal-containing oxygen-complexing agent capable of reversibly binding oxygen; and (b) maintaining the oxygen partial pressure on the product side of the membrane at least about 10 mmHg less than that of the feed stream.

In another embodiment of the present invention, oxygen is selectively separated from atmospheric air or other oxygen-containing gaseous stream by a facilitated-transport process schematically shown in FIG. 1 comprising (a) bringing the feed stream into contact with the same type of novel membrane discussed above and (b) maintaining the temperature on the product side of the membrane at least about 5° C. higher than that of the feed stream.

In the process of the present invention, it has been discovered that certain combinations of solvents and nitrogen- and/or oxygen-containing Lewis bases defined as "axial bases" unexpectedly enhance the ability of certain metal-containing complexes to selectively and rapidly transport oxygen across membranes to a degree never before thought possible in the art, while at the same time allowing extended life of the liquid membrane carrier system beyond anything encountered or predicted in the prior art. Oxygen-to-nitrogen selectivities of as high as 30, oxygen permeabilities greater than $1 \times 10^{-7}$ cm$^3$-cm/cm$^2$-sec-cmHg, and liquid membrane lifetimes of several months are obtainable with the process of the present invention, and the energy requirement is a fraction of that of cryogenic processes.

In the process of the present invention, the complexing agent binds oxygen at the interface of the feed stream with the liquid membrane, diffuses to the interface of the product stream with the membrane where it liberates the oxygen to the product stream, and then diffuses back to the feed-stream interface to repeat the process. The driving force for this can be either a pressure or temperature differential or a pressure and temperature differential across the membrane; a lower oxygen partial pressure or a higher temperature, or both a lower oxygen partial pressure and a higher temperature on the product side than on the feed side will suffice. As an example, for the sole purpose of illustration, a lower oxygen partial pressure on the product side may be produced by continuously removing the gases emerging from the liquid membrane by means of a vacuum pump or a continuously flowing gas or liquid stream, or by combination of a vacuum pump and a gas stream.

Appropriate apparatus for utilizing the process and membrane of the present invention includes means for regulating pressure and circulating air and its components through the membrane and for collecting the components, such as compressors, blowers, fans and vacuum pumps, means for physically supporting and containing the membrane, such as modules, means for regulating temperature, such as refrigeration units, means for measuring and regulating the flow rate and partial pressure of air and its components, such as flow meters and regulators, and means for storing the air components, such as storage and surge tanks.

DETAILED DESCRIPTION OF THE INVENTION

Figure 1:
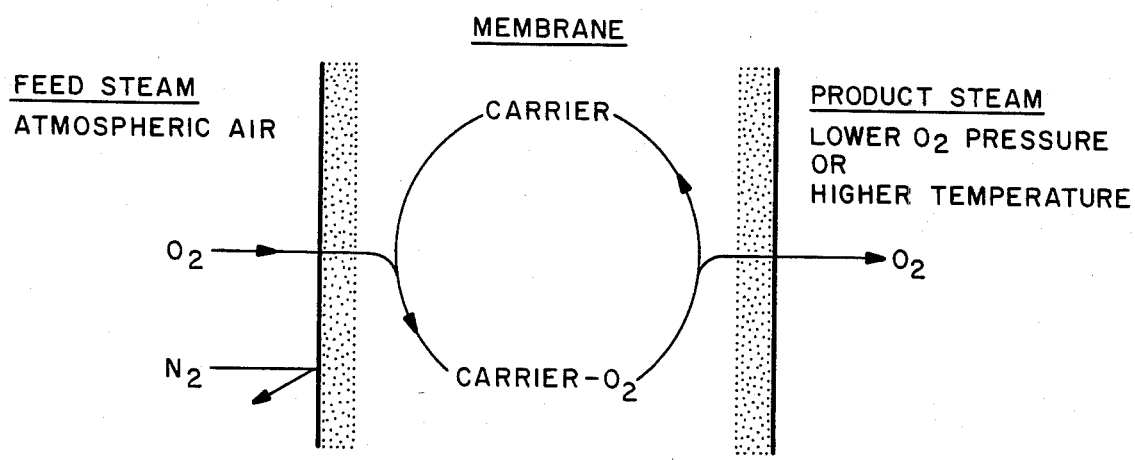
FIG. 1 is a schematic diagram showing the novel membrane and facilitated-transport process of the present invention.
Figure 2:
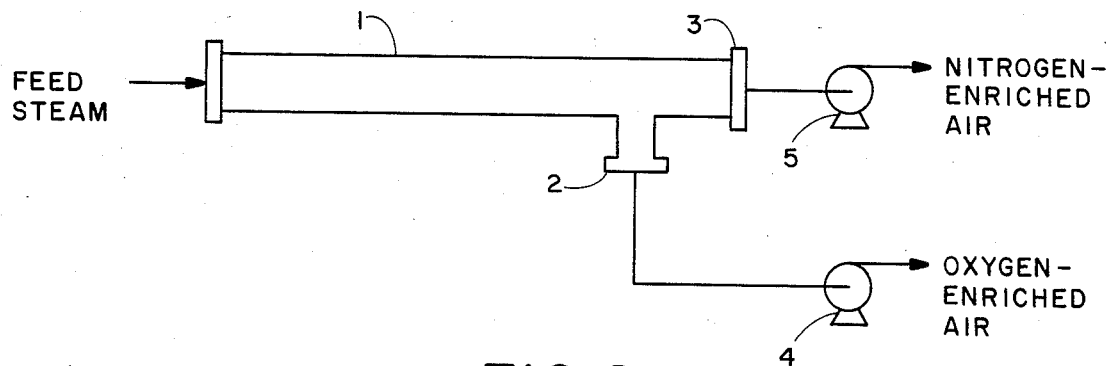
FIG. 2 is a schematic diagram showing exemplary apparatus embodying the novel membrane and facilitated-transport process of the present invention.

The feed stream for the separation process of the present invention may be ordinary atmospheric air or other gaseous stream containing oxygen. Since, in the case of air, nitrogen is the only other primary component, the present invention is also useful for the recovery of nitrogen and nitrogen-enriched air. As schematically shown in FIGS. 1 and 2, the feed stream is brought into contact with the novel liquid membrane preferably in a membrane module 1 and preferably at substantially atmospheric pressure for economic reasons, but other pressures on the feed side of the membrane are also acceptable so long as the partial pressure of oxygen on the product side 2 of the membrane is at least approximately 10 mmHg lower than the oxygen partial pressure on the feed side, or the temperature on the product side of the membrane is at least approximately 5° C. higher than the temperature on the feed side of the membrane. The feed stream input may be controlled by a flow meter or regulator (not shown) on the feed stream side of the membrane module 1. The lower partial pressure on the product side may be maintained by any suitable means, for example a vacuum pump 4 equipped with a regulator (not shown) when the feed stream is of substantially atmospheric pressure. If a higher partial pressure on the feed stream side is desired this may be accomplished by compressor or fan means (not shown) on the feed stream side of the module 1. The process of the present invention is preferably conducted at substantially room temperature and slightly cooler, but may be operated in the range of $-50°$ C. to $+100°$ C. Temperature may be controlled by any suitable refrigeration or heating means (not shown), preferably surrounding the membrane module 1.

The novel liquid membrane of the present invention comprises essentially four elements: (1) a membrane support; (2) a solvent; (3) an "axial base"; and (4) an oxygen carrier. The liquid membrane is itself preferably physically contained and supported in the membrane module 1, preferably of a generally hollow tube construction with plugs inserted in the feed stream and product stream openings, the plugs having suitable apertures to form inlet and outlet passages. Suitable materials for the membrane module are plexiglass, polyvinylchloride and stainless steel.

The membrane support may be any solid film which is compatible with the other three components and capable of containing them within its boundaries, but is preferably a microporous polymeric film less than 2 mm in thickness. Examples of microporous supports are polysulfone, polyamides, cellulose esters and other cellulose derivatives, polyhalogenated hydrocarbons such as polytetrafluoroethylene, polyvinylhalides, polyvinylidenehalides, polyesters, nylons, polyurethanes, polyolefins such as polypropylene, polycarbonate, silicone rubber, and polysaccharides. In some cases, the support may comprise a nonporous polymeric film that is swollen by the solvent/axial base/carrier solution or it may comprise the solidified solvent/axial base/carrier solution itself.

Solvents found to be useful in the present invention are generally organic liquids or mixtures of organic liquids which are preferably polar, although non-polar liquids may be useful in some cases. In other cases, the solvent may comprise a mixture of organic liquids and water. The solvent, when combined with the axial base, must dissolve the oxygen carrier at useful concentrations (preferably in excess of 0.05M), it must remain in the membrane support during operation, and it should allow minimal nitrogen transport, preferably with a nitrogen permeability of less than $1 \times 10^{-8}$ cm$^3$-cm/cm$^2$-sec-cmHg. In order for the solvent to remain in the support during operation, it should be nonvolatile and it should be compatible with the support. If the solvent is not sufficiently nonvolatile, it can be maintained in the membrane by maintaining a solvent-saturated vapor adjacent to the membrane. Although normally in the liquid state, under operating conditions the solvent may be in either the solid or liquid state.

Classes of useful solvents include lactones, lactams, sulfoxides, nitriles, amides, amines, esters, ethers and other nitrogen-containing liquids. Preferred examples include gamma-butyrolactone, dimethylsulfoxide, N-methylpyrrolidone, propylene carbonate, dimethylacetamide, gamma-valerolactone, delta-valerolactone, epsilon-caprolactone, diethylsulfoxide, benzonitrile, and tributylphosphate. In addition, oligomers or polymers of these classes of solvents may be useful.

Generally speaking, "axial bases," or certain classes of Lewis bases usually containing a nitrogen atom or in some cases an oxygen, or sulfur, or phosphorus atom, or a combination of these must be present in the novel liquid membrane of the present invention. Such an axial base provides an additional coordinating atom to those contained in the oxygen carrier, which assists in the reversible binding of oxygen. Classes of axial bases found useful are imidazoles, ketones, amides, amines, sulfoxides, pyridines, and other Lewis bases containing secondary or tertiary nitrogen. Preferred examples include 1-methylimidazole, 2-methylimidazole, 1,2-dimethylimidazole, dimethylsulfoxide, N,N'-diethylenediamine, 4-dimethylaminopyridine, 4-aminopyridine, pyridine, 4-methylpyridine, 4-methylaminopyridine, 3,4-lutidine, 3,5-lutidine, 4-cyanopyridine, 4-methoxypyridine, 4,4-bipyridine, pyrazine, 4-pyrrolidinopyridine, N-methylpyrazinium halides.

The oxygen carriers useful in the present invention may be described as metal-containing complexes containing the structure

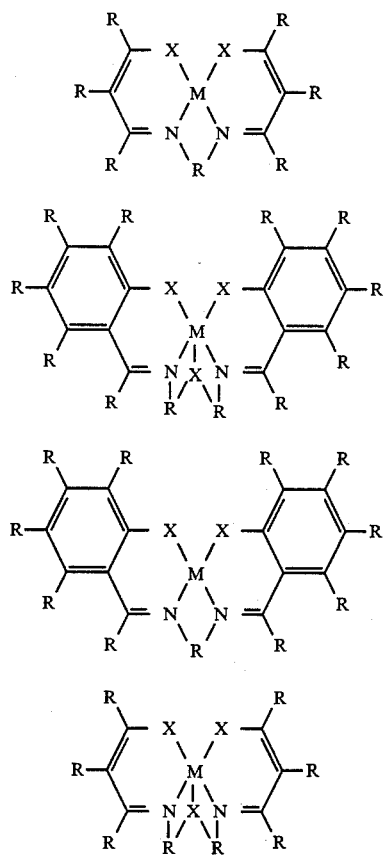

-continued

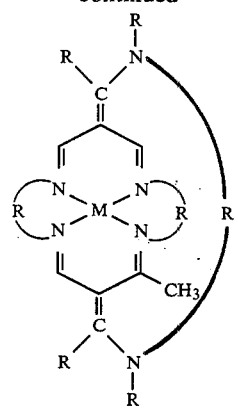

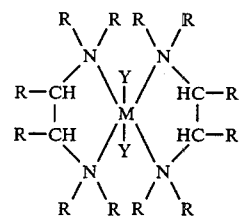

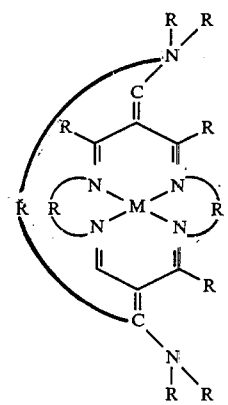

wherein M represents a metal such as cobalt, iron, nickel, copper, manganese, ruthenium, or rhodium; X is —O—, —S—, $$-\underset{\underset{R}{|}}{P}-, \text{ or } -\underset{\underset{R}{|}}{N}-;$$

R is hydrogen, alkyl, aryl, halogen, alkoxy, or a nitrogen-containing moiety; and Y represents a halide, nitrate, thiocyanate, or cyanide anion. Preferred metals are cobalt(II) and iron(II). Successful carriers must exhibit rapid oxygenation and deoxygenation, must be readily soluble in solutions of the solvents and axial bases noted above, and must be stable to irreversible oxidation or other degradation. The carriers generally bind oxygen at sufficiently high oxygen pressures and sufficiently low temperatures, and they generally release the oxygen at sufficiently low oxygen pressures and sufficiently high temperatures. Classes of such carriers found useful include metal-containing complexes generally of the following structures:

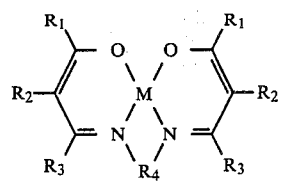

Bis(acetylacetone) ethylenediimine derivatives

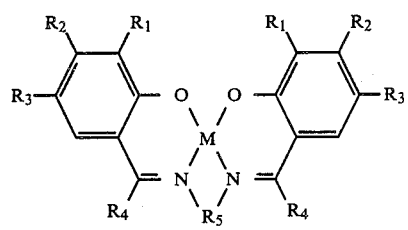

N,N′—bis(salicylidene)ethylenediamine derivatives

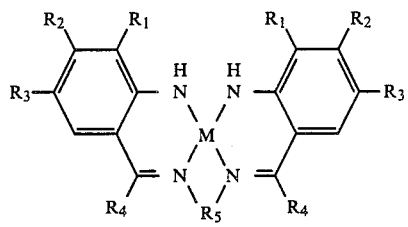

Bis(2-amino-1-benzaldehyde)-ethylenediimine derivatives

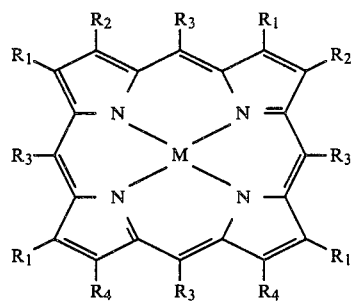

Porphyrin derivatives

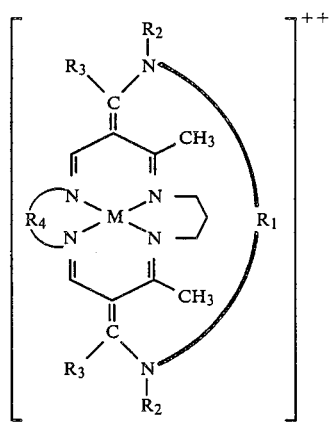

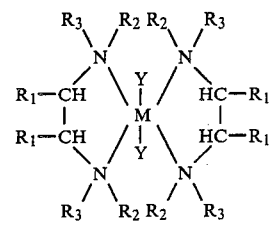

"Dry-cave" complex derivatives

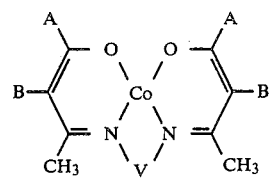

N,N′—substituted ethylenediimine derivatives wherein M is the metal atom; the "R" groups represent hydrocarbon moieties with or without hetero-atoms, including alkyl groups, aryl groups, alkoxy groups, halides, or nitrogen-containing groups; and Y represents a halide, nitrate, thiocyanate or cyanide anion.

Specific examples include those shown in Tables I–IV, taken from a review by Jones, Summerville, and Basolo in *Chemical Reviews* 79 (1979) 139; those shown in Table V, described by Khare, Lee-Ruff and Lever in *Canad. J. Chem.* 54 (1976) 3424; those described by Stevens and Busch in *J. Amer. Chem. Soc.* 102 (1980) 3285; those described by Collman in *Accts. Chem. Res.* 10 (1977) 265; and those described by Almog, Baldwin, Dyer and Peters in *J. Amer. Chem. Soc.* 97 (1975) 226.

TABLE I

| Compound | V | A | B |
|---|---|---|---|
| Co(acacen) | —(CH$_2$)$_2$— | CH$_3$ | H |
| Co(Meacacen) | —(CH$_2$)$_2$— | CH$_3$ | CH$_3$ |
| Co(Phacacen) | —(CH$_2$)$_2$— | CH$_3$ | C$_6$H$_5$ |
| Co(benacen) | —(CH$_2$)$_2$— | C$_6$H$_5$ | H |
| Co(Clbenacen) | —(CH$_2$)$_2$— | p-ClC$_6$H$_4$ | H |
| Co(Brbenacen) | —(CH$_2$)$_2$— | p-BrC$_6$H$_4$ | H |
| Co(Mebenacen) | —(CH$_2$)$_2$— | p-CH$_3$C$_6$H$_4$ | H |
| Co(Meobenacen) | —(CH$_2$)$_2$— | p-CH$_3$OC$_6$H$_4$ | H |
| Co(bensacen)$^a$ | —(CH$_2$)$_2$— | C$_6$H$_5$ | H |
| Co(Clbensacen)$^a$ | —(CH$_2$)$_2$— | p-ClC$_6$H$_4$ | H |
| Co(Brbensacen)$^a$ | —(CH$_2$)$_2$— | p-BrC$_6$H$_4$ | H |
| Co(Mebensacen)$^a$ | —(CH$_2$)$_2$— | p-CH$_3$C$_6$H$_4$ | H |
| Co(Meobensacen)$^a$ | —(CH$_2$)$_2$— | p-CH$_3$OC$_6$H$_4$ | H |
| Co(sacacen)$^a$ | —(CH$_2$)$_2$— | CH$_3$ | H |
| Co(sacacen)$^a$ | —(CH$_2$)$_2$— | CH$_3$ | H |
| Co(sacsacpn)$^a$ | —CH$_2$—CH—<br>\|<br>CH$_3$ | CH$_3$ | H |
| Co(sacsactn) | —(CH$_2$)$_3$— | CH$_3$ | H |
| Co(sacsacchxn) | —CH$_2$—CH$_2$—<br>(CH$_2$)$_4$ | CH$_3$ | H |

$^a$oxygen atoms are replaced by sulfur

TABLE II

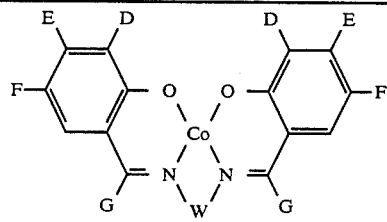

| Compound | W | D | E | F | G |
|---|---|---|---|---|---|
| Co(salen) | —(CH$_2$)$_2$— | H | H | H | H |
| Co(3-MeOsalen) | —(CH$_2$)$_2$— | CH$_3$O | H | H | H |
| Co(4,6-Me$_2$salen) | —(CH$_2$)$_2$— | H | CH$_3$ | H | CH$_3$ |
| Co(Fsalen) | —(CH$_3$)$_2$— | F | H | H | H |
| Co(napsalen) | —(CH$_2$)$_2$— | H | b | H | H |
| Co(saloph) | —C$_6$H$_4$— | H | H | H | H |
| Co(sal($\pm$) or (m)bn) | —CH—CH—<br>\|   \|<br>CH$_3$ CH$_3$ | H | H | H | H |
| Co(sal($\pm$) or (m)dpen) | —CH—CH—<br>\|   \|<br>C$_6$H$_5$ C$_6$H$_5$ | H | H | H | H |
| Co(sal($\pm$) or (m)chxn) | —CH—CH—<br>\\  /<br>(CH$_2$)$_4$ | H | H | H | H |
| Co(saldpt) | —(CH$_2$)$_3$—NH—(CH$_2$)$_3$— | H | H | H | H |
| Co(3-MeOsaldpt) | —(CH$_2$)$_3$—NH—(CH$_2$)$_3$— | CH$_3$O | H | H | H |
| Co(5-MeOsaldpt) | —(CH$_2$)$_3$—NH—(CH$_2$)$_3$— | H | H | CH$_3$O | H |
| Co(5-NO$_3$saldpt) | —(CH$_2$)$_3$—NH—(CH$_2$)$_3$— | H | H | NO$_2$ | H |
| Co($\alpha$-Mesaldpt) | —(CH$_2$)$_3$—NH—(CH$_2$)$_3$— | H | H | H | CH$_3$ |
| Co(salMedpt) | —(CH$_2$)$_3$—NCH$_3$—(CH$_2$)$_3$— | H | H | H | H |
| Co(3-MeOsalMedpt) | —(CH$_2$)$_3$—NCH$_3$—(CH$_2$)$_3$— | CH$_3$O | H | H | H |
| Co(5-MeOsalMedpt) | —(CH$_2$)$_3$—NCH$_3$—(CH$_2$)$_3$— | H | H | CH$_3$O | H |
| Co($\alpha$-MesalMedpt) | —(CH$_2$)$_3$—NCH$_3$—(CH$_2$)$_3$— | H | H | H | CH$_3$ |
| Co(sal-n-Prdpt) | —(CH$_2$)$_3$—N(n-C$_3$H$_2$)—(CH$_2$)$_3$— | H | H | H | H |
| Co(sal-i-Prdpt) | —(CH$_2$)$_3$—N(i-C$_4$H$_9$)—(CH$_2$)$_3$— | H | H | H | H |
| Co(salBydpt) | —(CH$_2$)$_3$—N(CH$_2$C$_6$H$_5$)—(CH$_2$)$_3$— | H | H | H | H |
| Co(salPhdpt) | —(CH$_2$)$_3$—N(C$_6$H$_5$)—(CH$_2$)$_3$— | H | H | H | H |
| Co(sal-p-MeOPhdpt) | —(CH$_2$)$_3$—N(p-CH$_3$OC$_6$H$_4$)—(CH$_2$)$_3$— | H | H | H | H |
| Co(5-BrsalMedapp) | —(CH$_2$)$_3$—PCH$_3$—(CH$_2$)$_3$— | H | H | Br | H |
| Co(3-MeosalMedapp) | —(CH$_2$)$_3$—PCH$_3$—(CH$_2$)$_3$— | CH$_3$O | H | H | H |
| Co(5-Brsaldape) | —(CH$_2$)$_3$—O—(CH$_2$)$_3$— | H | H | Br | H |
| Co(5-Clsaldape) | —(CH$_2$)$_3$—O—(CH$_2$)$_3$— | H | H | Cl | H |
| Co(saltmen) | —C———C—<br>\|   \|<br>(CH$_3$)$_2$ (CH$_3$)$_2$ | H | H | H | H |
| Co(salpy) | —CH$_2$—CH(CH$_2$CH$_2$C$_5$H$_4$N)— | H | H | H | H |

[b] Benzene rings are replaced by naphthalene rings.

TABLE III

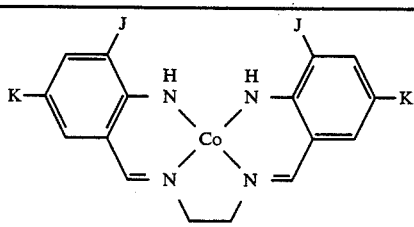

| Compound | J | K |
|---|---|---|
| Co(amben) | H | H |
| Co(NO$_2$amben) | H | NO$_2$ |
| Co(MeOamben) | MeO | H |
| Co(cyen)[c] | H | H |

[c] ethylene bridge replaces the two protons on the nitrogen atoms.

TABLE IV

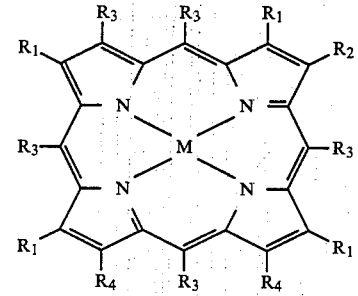

| Porphyrin | R$_1$ | R$_2$ | R$_3$ | R$_4$ |
|---|---|---|---|---|
| Protoporphyrin IX | Me | V | H | P |
| Mesoporphyrin IX | Me | Et | H | P |
| Deuteroporphyrin IX | Me | H | H | P |
| Pyrroporphyrin XV | Me | Et | H | P |

TABLE IV-continued

[Porphyrin structure with R1, R2, R3, R4 substituents around central M]

| Porphyrin | R1 | R2 | R3 | R4 |
|---|---|---|---|---|
| meso-Tetraphenylporphin | H | H | Ph | H |
| Octaethylporphyrin | Et | Et | H | Et |
| 2,4-Diacetyldeuteroporphyrin IX | Me | COCH3 | H | P |

Abbreviations: Me, methyl; V, vinyl; P, propionic acid; Et, ethyl; Ph, phenyl.

TABLE V

[Co complex structure with R1, R2, R3 substituents and Y ligands]

| Compound | Y | R1 | R2 | R3 |
|---|---|---|---|---|
| Co(s-Me2en)2Y2 | Cl, Br, I, NO3, SCN | H | CH3 | H |
| Co(s-Me2en)2Y2 | Cl, Br, I, NO3, SCN | CH3 | CH3 | H |
| Co(s-Et2en)2Y2 | Cl, Br, I, NO3, SCN | H | C2H5 | H |

Four of the most preferred carriers are N,N'-bis(-salicylideneimino)di-n-propylaminecobalt(II) [Co(-salPr)], N,N'-bis(3-methoxysalicylidene)ethylenediaminecobalt(II)[Co(3-MeOsalen)], N,N'-bis-(3-methoxysalicylidene)tetramethylethylenediaminecobalt(II)[Co(3-MeOsaltmen)], and the Co(dry-caves), shown below:

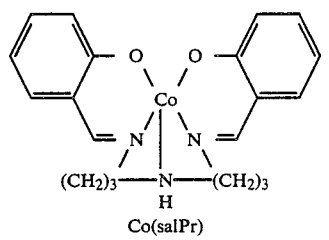
Co(salPr)

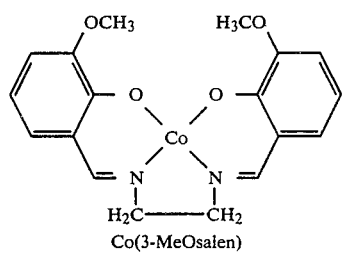
Co(3-MeOsalen)

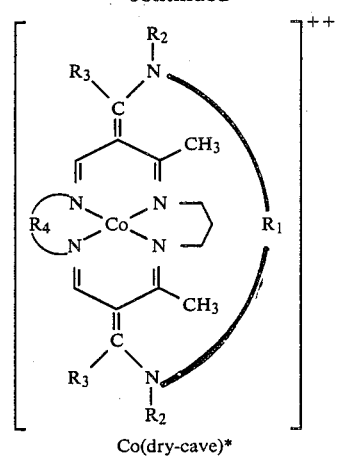
Co(dry-cave)*

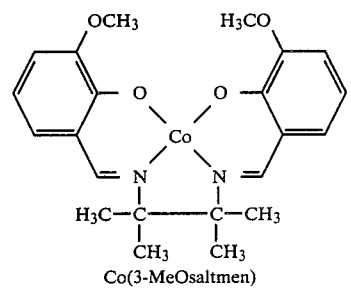
Co(3-MeOsaltmen)

*Wherein $R_1$ is $(CH_2)_4$, $(CH_2)_5$, $(CH_2)_6$, $(CH_2)_7$, or $(CH_2)_8$ or branched-chain alkyl groups containing 4 to 8 carbon atoms; $R_2$ is $CH_3$ or H; $R_3$ is $CH_3$ or $C_6H_5$; $R_4$ is $(CH_2)_2$ When the configuration of the oxygen carrier is is

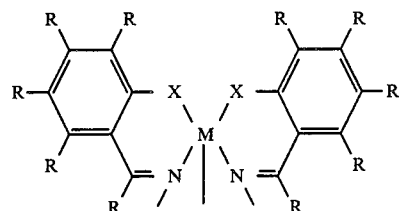

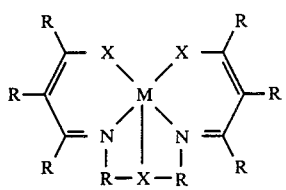

the axial base may be dispensed with, for the reason that there are sufficient oxygen, nitrogen, or sulfur coordinating atoms present within the carrier itself.

In the case of Co(3-MeOsaltmen) and perhaps in other cases, small amounts of added water (on the order of less than 20% by volume) enhance carrier performance. This is unexpected in view of the fact that protic solvents such as water are generally known to irreversibly oxidize such metal complexes. A similar effect predictably occurs with some inorganic or organic acids, bases, or alcohols.

The membrane module 1 is preferably provided with one or more product-stream apertures 2 and 3 for the recovery of product. As shown in FIG. 2, aperture 2 is connected to a vacuum pump 4 for recovery of oxygen.

An oxygen analyzer (not shown) for determining the percentage of oxygen in the product stream, may be utilized either before or after the vacuum pump 4. The outlet of the vacuum pump 4 may be connected to a storage or surge tank (not shown) for storage of the recovered oxygen. The oxygen-depleted or nitrogen-enriched air is taken off through another aperture 3 of module 1 by suitable means such as a fan 5. If desired, a flow meter or regulator (not shown) may also be used at either of the product-stream apertures.

EXAMPLES

Facilitated-transport membranes of the present invention were prepared by immersing a microporous polymeric film in a liquid comprising the oxygen carrier, axial base, and solvent. In the examples given below, the microporous membrane support was 130-$\mu$m-thick nylon 6,6, commercially available as Ultipor® NM, made by Pall Trinity Micro Corporation of Cortland, N.Y. The pores of the film became filled with the liquid by capillary action. The loaded membrane was then placed between the two compartments of a permeation cell and was degassed prior to the permeation measurement. The feed-side oxygen partial pressure was maintained at 160 mmHg. The product-side oxygen partial pressure was then adjusted as indicated, and the gas flux was determined by measuring the velocity of a mercury droplet in a calibrated capillary flow meter. The measured flux was normalized for membrane thickness and porosity to yield the permeability. In some cases the oxygen concentration in the product stream was measured by gas chromatography. The remainder of the conditions were as noted in the tables that follow.

Representative results of tests at 25° C. showing facilitated transport of oxygen with atmospheric air as the feed and the Co(dry-cave) oxygen carriers are presented in Table VI. The oxygen carriers used in these examples are located as Co[16](NMe)C$_6$-cave where R$_1$ is (CH$_2$)$_6$, R$_2$ and R$_3$ are $CH_3$, and R$_4$ is (CH$_2$)$_3$; and Co[16](NMe)C$_5$-cave where R$_1$ is (CH$_2$)$_5$, R$_2$ is CH$_3$, R$_3$ is CH$_3$, and R$_4$ is (CH$_2$)$_3$. The axial base used was 1-methylimidazole (1-MeIm) and the solvent was dimethylsulfoxide (DMSO). The highest oxygen permeability recorded was greater than that of silicone rubber, which is the most oxygen-permeable polymeric membrane known. The highest selectivity was 25, which is over 10 times that of silicone rubber.

TABLE VI

| Membrane | Product-Side Pressure (mmHg) | Oxygen Permeability $\left(\frac{10^{-9} \text{ cm}^3\text{-cm}}{\text{cm}^2\text{-sec-cmHg}}\right)$ | O$_2$/N$_2$ Selectivity | Oxygen Content of Product Gas (%) |
|---|---|---|---|---|
| 0.02 M Co[16](NMe)C$_6$-cave + 1.5 M 1-MeIm in DMSO | 1 | 28 | 8.7 | 69 |
|  | 10 | 17 | 5.4 | 58 |
| 0.10 M Co[16](NMe) C$_6$-cave + 1.5 M 1-MeIm in DMSO | 1 | 61 | 20 | 84 |
|  | 10 | 33 | 10 | 70 |
| 0.02 M Co[16](NMe)C$_5$-cave + 1.5 M 1-MeIm in DMSO | 1 | 22 | 7.3 | 66 |
|  | 10 | 21 | 7.0 | 61 |
| 0.20 M Co[16](NMe)C$_5$-cave + 0.5 M 1-MeIm in DMSO | 1 | 75 | 25 | 87 |

Facilitated transport of oxygen with Co(salPr), Co(3-MeOsalen), and Co(3-MeOsaltmen) is shown in Table VII. Co(salPr) did not require an axial base, and 4-dimethylaminopyridine (DMAP) was used as the axial base with the other carriers. Solvents used in these examples included DMSO, gamma-butyrolactone, dimethylacetamide (DMAC), and N-methylpyrrolidone (NMP). The highest oxygen permeability recorded was more than twice that of silicone rubber, and the highest oxygen-to-nitrogen selectivity was 30, which resulted in the production of 88% oxygen from air in a single pass through the membrane. Liquid membranes of the type shown in Table VII proved to be exceptionally and unexpectedly stable, producing approximately 65 to 80% oxygen from air for longer than 3 months.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

TABLE VII

| Membrane | Product-Side Pressure (mmHg) | Temperature (°C.) | Oxygen Permeability $\left(\frac{10^{-9} \text{ cm}^3\text{-cm}}{\text{cm}^2\text{-sec-cmHg}}\right)$ | O$_2$/N$_2$ Selectivity | Oxygen Content of Product Gas (%) |
|---|---|---|---|---|---|
| 0.4 M Co(salPr) in 1:1 DMSO and $v$-butyrolactone | 2 | 25 | 126* | 22 | 84 |
| 1.0 M Co(salPr) in 1:1 DMSO and $v$-butyrolactone | 2 | 25 | 150* | 30 | 88 |
| 0.3 M Co(MeOsalen) + 1 M DMAP in 1:1 DMSO and DMAC | 10 | 25 | 78* | 11 | 72 |
| 0.4 M Co(3-MeOsaltmen) + 1 M DMAP in $v$-butyrolactone | 25 | −10 | 100 | 18 | 81 |
| 0.4 M Co(3-MeOsaltmen) + 1 M DMAP in 4:1 | 25 | −5 | not measured | 29 | 87 |

TABLE VII-continued

| Membrane | Product-Side Pressure (mmHg) | Temperature (°C.) | Oxygen Permeability $\left(\dfrac{10^{-9}\ cm^3\text{-}cm}{cm^2\text{-sec-cmHg}}\right)$ | $O_2/N_2$ Selectivity | Oxygen Content of Product Gas (%) |
|---|---|---|---|---|---|
| DMSO and v-butyrolactone 0.4 M Co(3MeIsaltmen) + 0.6 M DMAP + 0.5 M H$_2$O in NMP | 25 | −10 | 60* | 16 | 79 |

*Calculated from measured oxygen content of permeating gas.

What is claimed is:

1. A process for the separation and purification of oxygen and nitrogen comprising:
   (a) bringing atmospheric air into contact with a membrane, said membrane separating said atmospheric air into a feed stream on one side of said membrane and a product stream on the other side of said membrane,
   (b) maintaining the oxygen partial pressure on the product-stream side of said membrane at least approximately 10 mmHg lower than the oxygen partial pressure on the feed-stream side of said membrane,
   (c) collecting oxygen from the product-stream side of said membrane and nitrogen from the feed-stream side of said membrane,
   (d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture, an axial base, and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

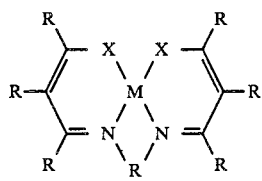

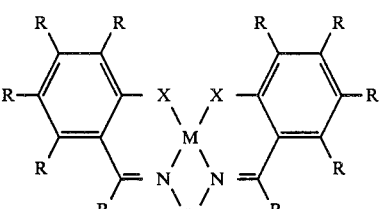

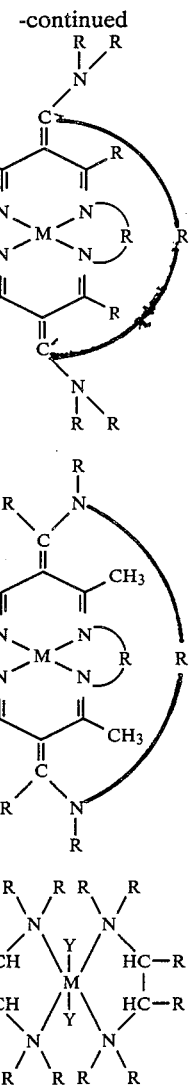

wherein
M is cobalt, iron, copper, nickel, manganese, ruthenium or rhodium;
X is —O—, —S—,

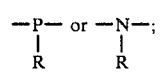

R is hydrogen, alkyl, aryl, halogen, alkoxy or a nitrogen-containing moiety; and
Y is halide, nitrate, thiocyanate or cyanide.

2. A process for the separation and purification of oxygen comprising:
   (a) bringing a gaseous oxygen-containing stream into contact with a membrane, said membrane separating said gaseous oxygen-containing stream into a feed stream on one side of said membrane and a product stream on the other side of said membrane,
   (b) maintaining the oxygen partial pressure on the product-stream side of said membrane at least approximately 10 mmHg lower than the oxygen partial pressure on the feed-stream side of said membrane,
   (c) collecting oxygen from the product-stream side of said membrane,
   (d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture, an axial base and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

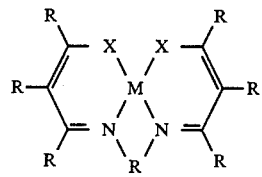

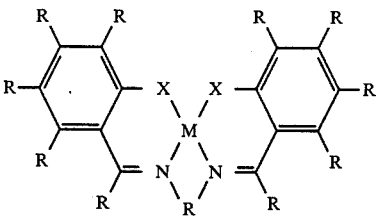

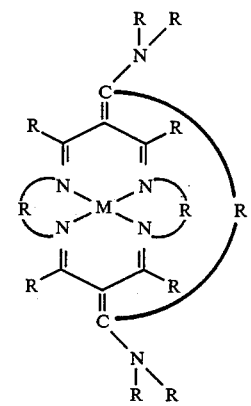

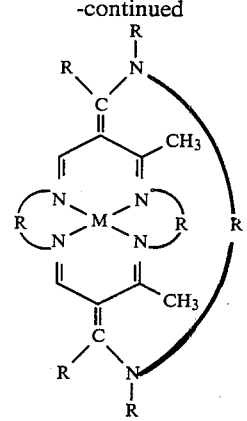

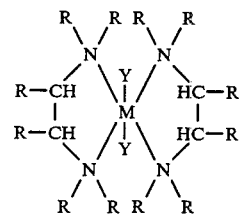

wherein
M is cobalt, iron, copper, nickel, manganese, ruthenium or rhodium;
X is —O—, —S—,

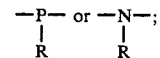

R is hydrogen, alkyl, aryl, halogen, alkoxy or a nitrogen-containing moiety; and
Y is halide, nitrate, thiocyanate or cyanide.

3. A process for the separation and purification of oxygen and nitrogen comprising:
   (a) bringing atmospheric air into contact with a membrane, said membrane separating said atmospheric air into a feed stream on one side of said membrane and a product stream on the other side of said membrane,
   (b) maintaining the temperature on the product-stream side of said membrane at least approximately 5° C. higher than the temperature on the feed-stream side of said membrane;
   (c) collecting oxygen from the product-stream side of said membrane and nitrogen from the feed-stream side of said membrane,
   (d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture, an axial base and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

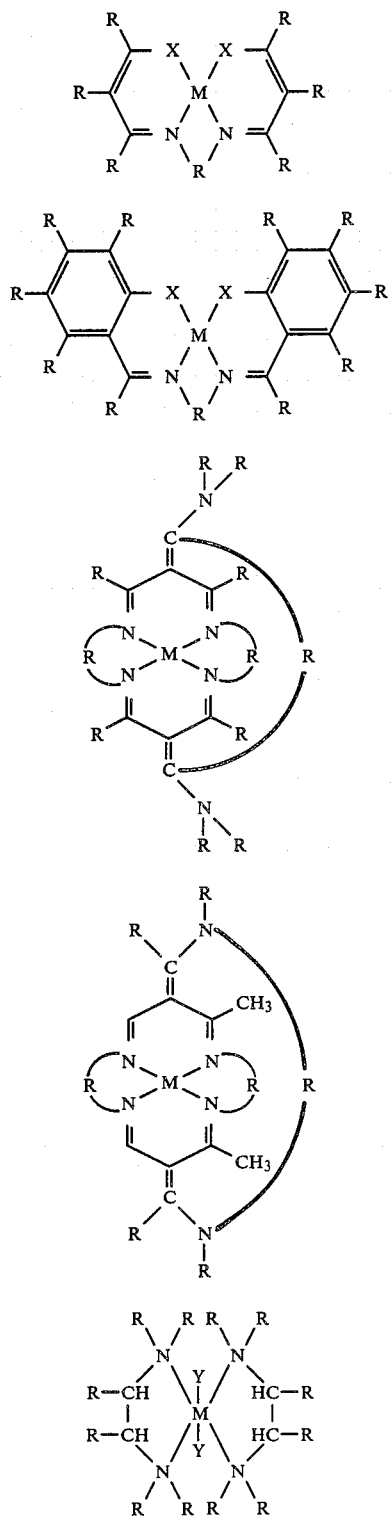

wherein
M is cobalt, iron, copper, nickel, manganese, ruthenium or rhodium;
X is —O—, —S—,

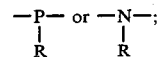

R is hydrogen, alkyl, aryl, halogen, alkoxy or a nitrogen-containing moiety; and
Y is halide, nitrate, thiocyanate or cyanide.

4. A process for the separation and purification of oxygen comprising:
(a) bringing a gaseous oxygen-containing stream into contact with a membrane, said membrane separating said gaseous oxygen-containing stream into a feed stream on one side of said membrane and a product stream on the other side of said membrane,
(b) maintaining the temperature on the product-stream side of said membrane at least approximately 5° C. higher than the temperature on the feed-stream side of said membrane,
(c) collecting oxygen from the product-stream side of said membrane,
(d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture, an axial base and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

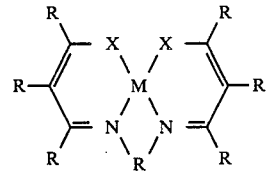

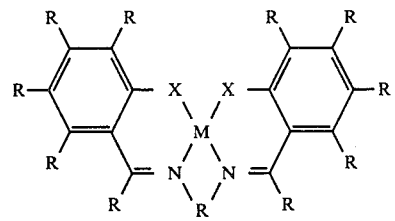

-continued

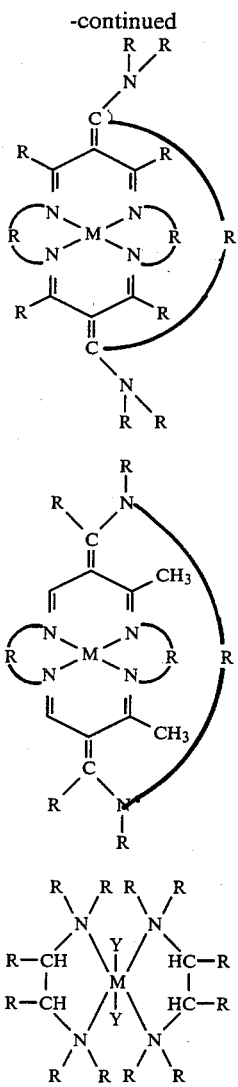

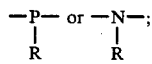

wherein
M is cobalt, iron, copper, nickel, manganese, ruthenium or rhodium;
X is —O—, —S—, $$-\overset{|}{\underset{R}{P}}- \text{ or } -\overset{|}{\underset{R}{N}}-;$$

R is hydrogen, alkyl, aryl, halogen, alkoxy or a nitrogen-containing moiety; and
Y is halide, nitrate, thiocyanate or cyanide.

5. A process for the separation and purification of oxygen and nitrogen comprising:
(a) bringing atmospheric air into contact with a membrane, said membrane separating said atmospheric air into a feed stream on one side of said membrane and a product stream on the other side of said membrane,
(b) maintaining the oxygen partial pressure on the product-stream side of said membrane at least approximately 10 mmHg lower than the oxygen partial pressure on the feed-stream side of said membrane,
(c) collecting oxygen from the product-stream side of said membrane and nitrogen from the feed-stream side of said membrane,
(d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture and a pentacoordinate oxygen carrier, said solvent or solvent mixture and pentacoordinate oxygen carrier being in the liquid phase when present together, said solvent or solvent mixture being capable of dissolving said pentacoordinate oxygen carrier, and said pentacoordinate oxygen carrier being a metal-containing complex having any of the structures

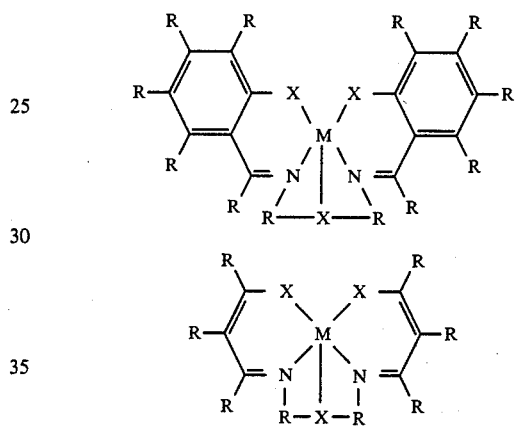

wherein
M is cobalt, iron, copper, nickel, manganese, ruthenium or rhodium;
X is —O—, —S—,

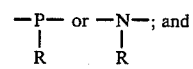

R is hydrogen, alkyl, aryl, halogen, alkoxy or a nitrogen-containing moiety.

6. A process for the separation and purification of oxygen comprising:
(a) bringing a gaseous oxygen-containing stream into contact with a membrane, said membrane separating said gaseous oxygen-containing stream into a feed stream on one side of said membrane and a product stream on the other side of said membrane,
(b) maintaining the oxygen partial pressure on the product-stream side of said membrane at least approximately 10 mmHg lower than the oxygen partial pressure on the feed-stream side of said membrane,
(c) collecting oxygen from the product-stream side of said membrane,
(d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture and a pentacoordinate oxygen carrier, said solvent or solvent mixture and pentacoordinate oxygen carrier being in the liquid phase when present together, said solvent or solvent mixture being capable of dissolving said pentacoordinate oxygen carrier, and said pentacoordinate oxygen carrier being a metal-containing complex having any of the structures

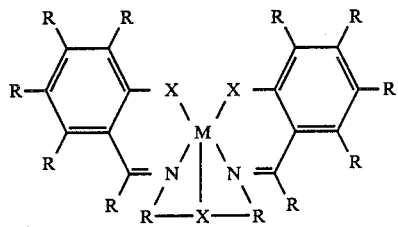

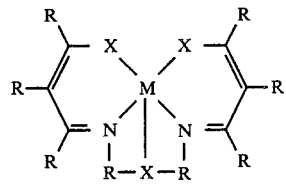

wherein
M is cobalt, iron, copper, nickel, manganese, ruthenium or rhodium;
X is —O—, —S—,

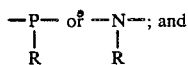

R is hydrogen, alkyl, aryl, halogen, alkoxy or a nitrogen-containing moiety.

7. A process for the separation and purification of oxygen and nitrogen comprising:
(a) bringing atmospheric air into contact with a membrane, said membrane separating said atmospheric air into a feed stream on one side of said membrane and a product stream on the other side of said membrane,
(b) maintaining the temperature on the product-stream side of said membrane at least approximately 5° C. higher than the temperature on the feed-stream side of said membrane,
(c) collecting oxygen from the product-stream side of said membrane and nitrogen from the feed-stream side of said membrane,
(d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture and a pentacoordinate oxygen carrier, said solvent or solvent mixture and pentacoordinate oxygen carrier being in the liquid phase when present together, said solvent or solvent mixture being capable of dissolving said pentacoordinate oxygen carrier, and said pentacoordinate oxygen carrier being a metal-containing complex having any of the structures

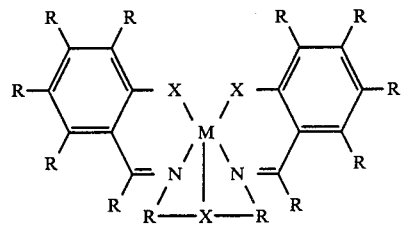

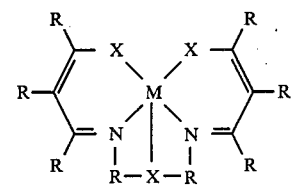

wherein
M is cobalt, iron, copper, nickel, manganese, ruthenium or rhodium;
X is —O—, —S—,

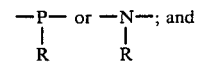

R is hydrogen, alkyl, aryl, halogen, alkoxy or a nitrogen-containing moiety.

8. A process for the separation and purification of oxygen comprising:
(a) bringing a gaseous oxygen-containing stream into contact with a membrane, said membrane separating said gaseious oxygen-containing stream into a feed stream on one side of said membrane and a product stream on the other side of said membrane,
(b) maintaining the temperature on the product-stream side of said membrane at least approximately 5° C. higher than the temperature on the feed-stream side of said membrane,
(c) collecting oxygen from the product-stream side of said membrane,
(d) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture and a pentacoordinate oxygen carrier, said solvent or solvent mixture and pentacoordinate oxygen carrier being in the liquid phase when present together, said solvent or solvent mixture being capable of dissolving said pentacoordinate oxygen carrier, and said pentacoordinate oxygen carrier being a metal-containing complex having any of the structures

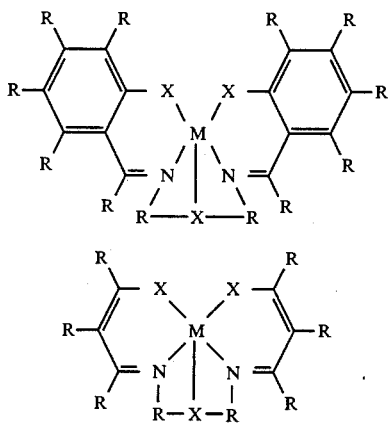

wherein
M is cobalt, iron, copper, nickel, manganese, ruthenium or rhodium;
X is —O—, —S—,

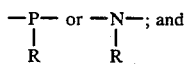

R is hydrogen, alkyl, aryl, halogen, alkoxy or a nitrogen-containing moiety.

9. The process of claims 1, 2, 5 or 6 wherein the oxygen partial pressure on the feed-stream side of said membrane is substantially atmospheric or less than atmospheric.

10. The process of claim 1, 2, 5 or 6 wherein the oxygen partial pressure on the feed-stream side of said membrane is at least about 10 mmHg higher than atmospheric.

11. The process of claim 1, 2, 5 or 6 conducted at a temperature of between about −50° C. and +100° C.

12. The process of claim 3, 4, 7 or 8 wherein the temperature on the feed-stream side of said membrane is between about −50° C. and +95° C.

13. The process of claim 1, 2, 3, 4, 5, 6, 7 or 8 wherein the metal is cobalt.

14. The process of claim 1, 2, 3 or 4 wherein the solvent or solvent mixture is selected from lactones, sulfoxides, nitriles, amines, amides, esters, ethers, and other nitrogen-containing liquids,
the axial base is selected from secondary or tertiary nitrogen-atom-containing Lewis bases, imidazoles, ketones, amides, amines, sulfoxides, pyridines and pyrazines, and
the oxyen carrier is selected from metal-containing bis(acetylacetone)ethylenediimines, N,N′bis(salicylidene)ethylenediimines, bis(2-amino-1-benzaldehyde)ethylenediimines, dry-cave compounds, and N,N′-substituted-ethylenediamines.

15. The process of claim 1, 2, 3 or 4 wherein the solvent or solvent mixture is selected from at least one of gamma-butyrolactone, dimethylsulfoxide, propylene carbonate, diethylsulfoxide, N-methylpyrrolidone, dimethylacetamide, gamma-valerolactone, delta-valerolactone, epsilon-caprolactone, tributylphosphate, dimethylformamide, diglyme and benzonitrile, and
the axial base is selected from at least one of 1-methylimidazole, 2-methylimidazole, 1,2-dimethylimidazole, dimethylsulfoxide, N,N′-diethylethylenediamine, 4-dimethylaminopyridine, 4-aminopyridine, 4,4-bipyridine, 4-methoxypyridine, 4-methylaminopyridine, 3,4-lutidine, 3,5-lutidine, pyridine, 4-methylpyridine, 4-cyanopyridine, pyrazine, 4-pyrrolidinopyridine and N-methylpyrazinium halides.

16. The process of claim 1, 2, 3 or 4 wherein the oxygen carrier is N,N′-bis(salicylideneimino)di-n-propylaminecobalt(II).

17. The process of claim 1, 2, 3 or 4 wherein the oxygen carrier is N,N′-bis(3-methoxysalicylidene)ethylenediaminecobalt(II).

18. The process of claim 1, 2, 3 or 4 wherein the oxygen carrier is N,N′-bis(3-methoxysalicylidene)tetramethylethylenediaminecobalt(II).

19. The process of claim 1, 2, 3 or 4 wherein the oxygen carrier is

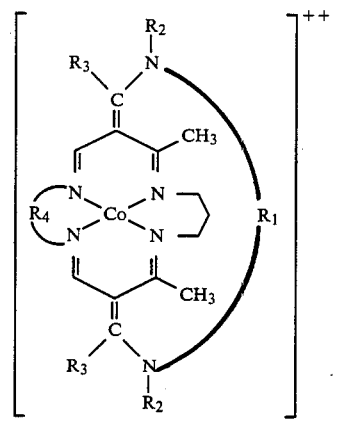

wherein
$R_1$ is a branched or straight-chain hydrocarbon or hetero-atom-containing bridge;
$R_2$ is hydrogen or methyl;
$R_3$ is methyl or benzyl; and
$R_4$ is alkyl containing 2 to 3 carbon atoms.

20. A membrane useful for the separation of oxygen and nitrogen from atmospheric air comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support, a solvent or solvent mixture, an axial base and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

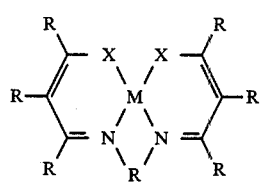

-continued

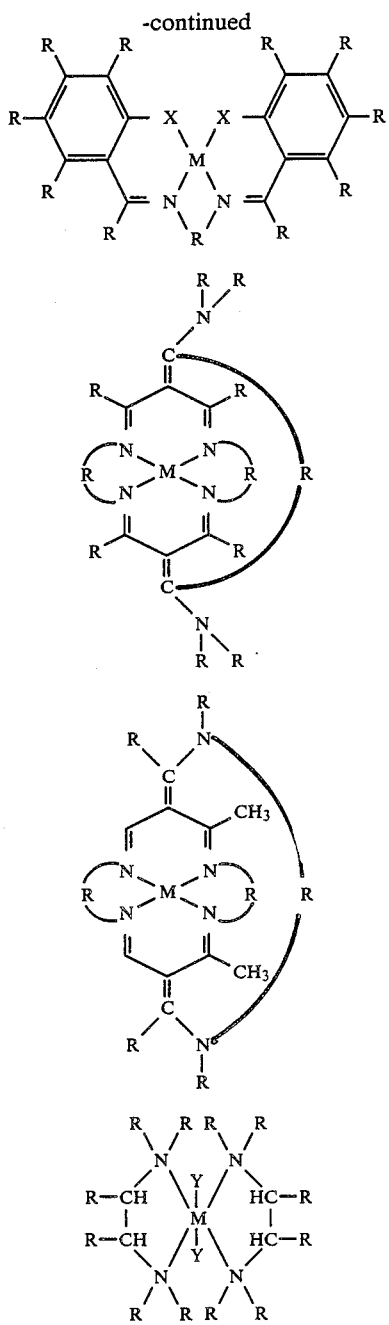

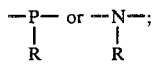

wherein
M is cobalt, iron, copper, nickel, manganese, ruthenium or rhodium;
X is —O—, —S—, $$-P- \text{ or } -N-;$$
$$\phantom{-P}\underset{R}{|} \phantom{ \text{ or } -N} \underset{R}{|}$$

R is hydrogen, alkyl, aryl, halogen, alkoxy or a nitrogen-containing moiety; and
Y is halide, nitrate, thiocyanate or cyanide.

21. The membrane of claim 20 wherein
the membrane support is a microporous polymeric film selected from polysulfones, polyamides, cellulose derivatives, polyhalogenated hydrocarbons polyesters, polyurethanes, polyolefins polycarbonates, polysaccharides, polyorganosilanes, and polyorganosiloxanes,
the solvent or solvent mixture is selected from lactones, lactams, sulfoxides, nitriles, amines, amides, esters, ethers and other nitrogen-containing liquids, and
the axial base is selected from Lewis bases containing secondary or tertiary nitrogen atoms, imidazoles, ketones, amides, amines, sulfoxides, pyrazines and pyridines.

22. The membrane of claim 20 wherein
the solvent is selected from at least one of gamma-butyrolactone, dimethylsulfoxide, propylene carbonate, diethylsulfoxide, N-methylpyrrolidone, dimethylacetamide, gamma-valerolactone, delta-valerolactone, dimethylformamide, formamide, epsilon-caprolactone, tributylphosphate, diglyme and benzonitrile,
the axial base is selected from at least one of 1-methylimidazole, 2-methylimidazole, 1,2,-dimethylimidazole, dimethylsulfoxide, N,N'-diethylethylenediamine, 4-dimethylaminopyridine, 4-aminopyridine, 4,4-bipyridine, 4-methoxypyridine, 4-methylaminopyridine, 3,4-lutidine, 3,5-lutidine, pyridine, 4-methylpyridine, 4-cyanopyridine, pyrazine, 4-pyrrolidinopyridine and N-methylpyrazinium halides, and
the oxygen carrier is selected from N,N'-bis(3-methoxysalicylidene)ethylenediaminecobalt(II), N,N'-bis(3-methoxysalicylidene)tetramethylethylenediaminecobalt(II), and

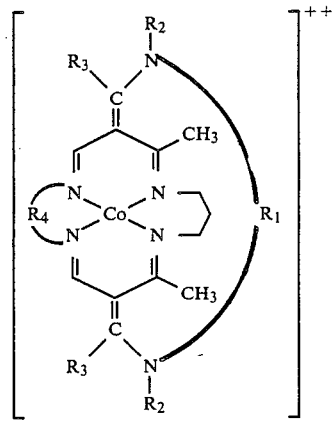

wherein
$R_1$ is a branched or straight-chain hydrocarbon or hetero-atom-containing bridge;
$R_2$ is hydrogen or methyl;
$R_3$ is methyl or benzyl; and
$R_4$ is alkyl containing 2 to 3 carbon atoms.

23. The membrane of claim 20 wherein the solvent is selected from gamma-butyrolactone and N-methylpyrrolidone and mixtures thereof, the axial base is 4-dimethylaminopyridine and the oxygen carrier is N,N'-bis(3-methoxysalicylidene)tetramethylethylenediaminecobalt(II).

24. The membrane of claim 20 wherein the oxygen carrier is N,N'-bis(3-methoxysalicylidene)tetramethylethylenediaminecobalt(II).

25. The membrane of claim 20 wherein the solvent is selected from gamma-butyrolactone and N-methylpyrrolidone and mixtures thereof, the axial base is selected from 4-aminopyridine and 4-cyanopyridine and the oxygen carrier is N,N'-bis(3-methoxysalicylidene)tetramethylethylenediaminecobalt(II).

26. The membrane of claim 20 wherein the solvent or solvent mixture contains an additive selected from the group consisting of less than or equal to 20% by weight water or an organic or inorganic acid or base.

27. A membrane useful for the separation of oxygen and nitrogen from atmospheric air comprising a membrane support, a solvent or solvent mixture and a pentacoordinate oxygen carrier, said solvent or solvent mixture and pentacoordinate oxygen carrier being in the liquid phase when present together, said solvent or solvent mixture being capable of dissolving said pentacoordinate oxygen carrier, and said pentacoordinate oxygen carrier being a metal-containing complex having any of the structures

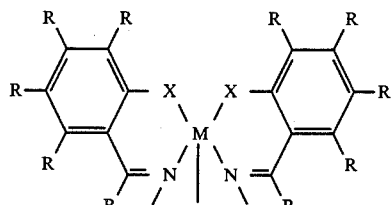

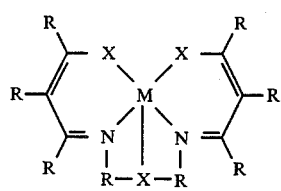

wherein
M is cobalt, iron, copper, nickel, manganese, ruthenium or rhodium;
X is —O—, —S—,

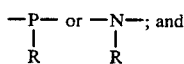

R is hydrogen, alkyl, aryl, halogen, alkoxy or a nitrogen-containing moiety.

28. The membrane of claim 27 wherein the oxygen carrier is N,N'-bis(salicylideneimino)di-n-propylaminecobalt(II).

29. Apparatus for the separation and purification of oxygen and nitrogen comprising:
(a) membrane means,
(b) means for bringing atmospheric air into contact with said membrane means, said membrane means separating said atmospheric air into a feed stream on one side of said membrane means and a product stream on the other side of said membrane means,
(c) means for maintaining the oxygen partial pressure on the product-stream side of said membrane means at least approximately 10 mmHg lower than the oxygen partial pressure on the feed-stream side of said membrane means,
(d) means for collecting oxygen from the product-stream side of said membrane means and nitrogen from the feed-stream side of said membrane means;
(e) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysacharides, polyorganosilanes, and polyorganosiloxanes, said membrane support containing a solvent or solvent mixture, an axial base and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

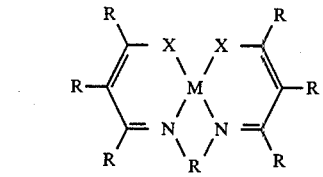

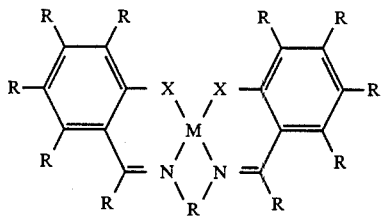

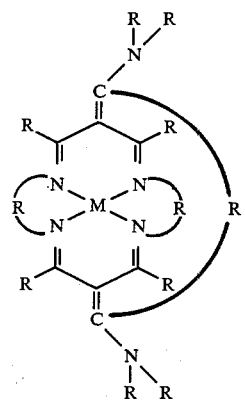

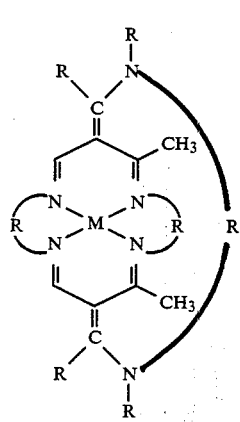

-continued

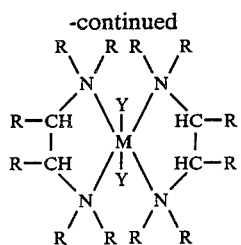

wherein
M is cobalt, iron, copper, nickel, manganese, ruthenium or rhodium;
X is —O—, —S—,

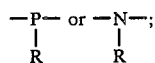

R is hydrogen, alkyl, aryl, halogen, alkoxy or a nitrogen-containing moiety; and
Y is halide, nitrate, thiocyanate or cyanide.

30. Apparatus for the separation and purification of oxygen comprising:
(a) membrane means,
(b) means for bringing a gaseous oxygen-containing stream into contact with said membrane means, said membrane means separating said gaseous oxygen-containing stream into a feed stream on one side of said membrane means and a product stream on the other side of said membrane means,
(c) means for maintaining the oxygen partial pressure on the product-stream side of said membrane means at least approximately 10 mmHg lower than the oxygen partial pressure on the feed-stream side of said membrane means,
(d) means for collecting oxygen from the product-stream side of said membrane means,
(e) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent, an axial base, an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

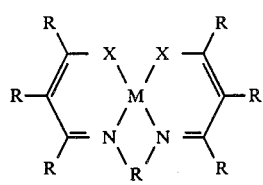

-continued

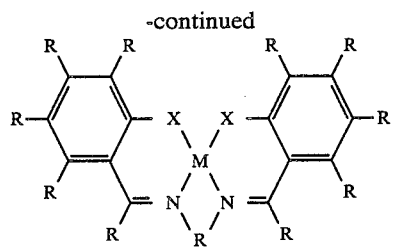

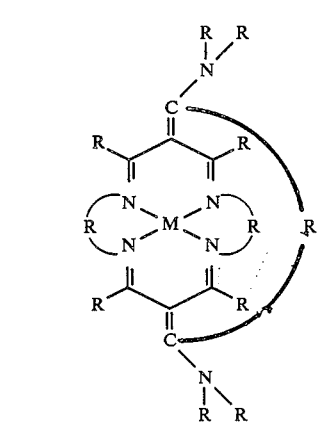

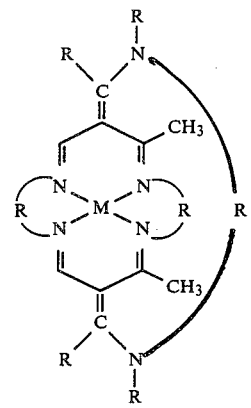

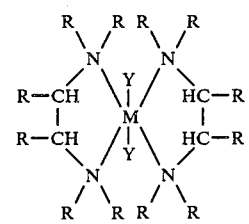

wherein
M is cobalt, iron, copper, nickel, manganese, ruthenium or rhodium;
X is —O—, —S—,

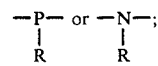

R is hydrogen, alkyl, aryl, halogen, alkoxy or a nitrogen-containing moiety; and
Y is halide, nitrate, thiocyanate or cyanide.

31. Apparatus for the separation and purification of oxygen and nitrogen comprising:
(a) membrane means, (b) means for bringing atmospheric air into contact with said membrane means, said membrane means separating said atmospheric air into a feed stream on one side of said membrane means and a product stream on the other side of said membrane means, (c) temperature maintenance means for maintaining the temperature on the product-stream side of said membrane means at least approximately 5° C. higher than the temperature on the feed-stream side of said membrane means, (d) means for collecting oxygen from the product-stream side of said membrane means and nitrogen from the feed-stream side of said membrane means, (e) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture, an axial base and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

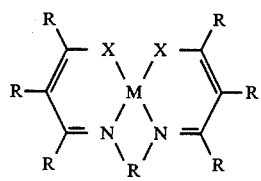

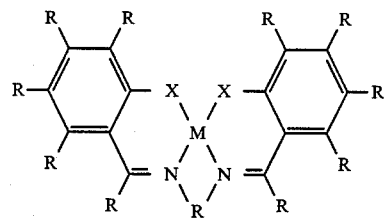

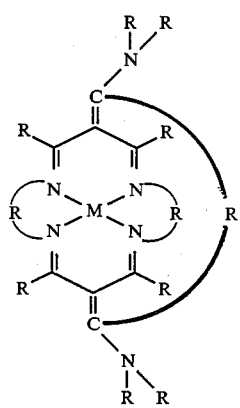

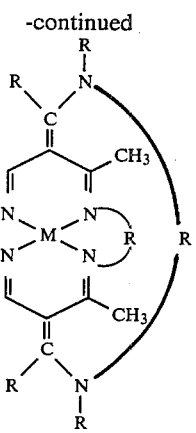

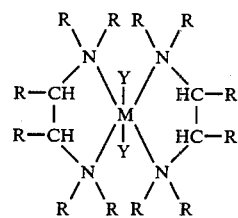

wherein
M is cobalt, iron, copper, nickel, manganese, ruthenium or rhodium;
X is —O—, —S—,

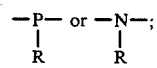

R is hydrogen, alkyl, aryl, halogen, alkoxy or a nitrogen-containing moiety; and
Y is halide, nitrate, thiocyanate or cyanide.

32. Apparatus for the separation and purification of oxygen comprising:

(a) membrane means, (b) means for bringing a gaseous oxygen-containing stream into contact with said membrane means, said membrane means separating said gaseous oxygen-containing stream into a feed stream on one side of said membrane means and a product stream on the other side of said membrane means, (c) temperature maintenance means for maintaining the temperature on the product-stream side of said membrane means at least approximately 5° C. higher than the temperature on the feed-stream side of said membrane means, (d) means for collecting oxygen from the product-stream side of said membrane means, (e) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture, an axial base and an oxygen carrier, said solvent or solvent mixture, axial base and oxygen carrier being in the liquid phase when present together, said solvent or solvent mixture being capable of dissolving the axial base and the oxygen carrier when they are present together, said axial base being capable of providing a coordinating atom to the oxygen carrier, and said oxygen carrier being a metal-containing complex having any of the structures

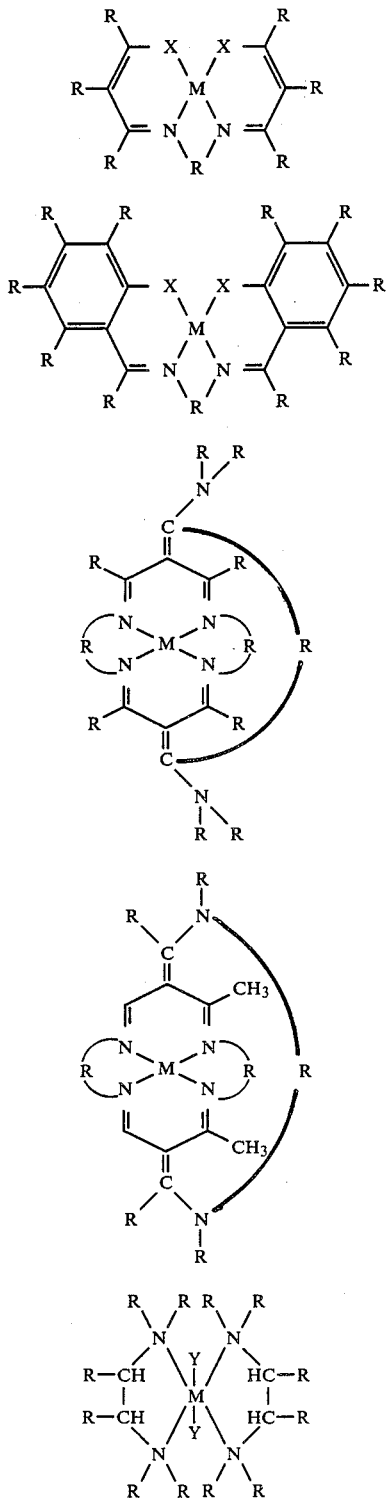

wherein
M is cobalt, iron, copper, nickel, manganese, ruthenium or rhodium;

X is —O—, —S—, $$-\underset{\underset{R}{|}}{P}-\text{ or }-\underset{\underset{R}{|}}{N}-;$$

R is hydrogen, alkyl, aryl, halogen, alkoxy or a nitrogen-containing moiety; and Y is halide, nitrate, thiocyanate or cyanide.

33. The apparatus of claim 29, 30, 31 or 32 wherein the metal is cobalt.

34. The apparatus of claim 29, 30, 31 or 32 wherein the solvent or solvent mixture is selected from at least one of gamma-butyrolactone, dimethylsulfoxide, propylene carbonate, diethylsulfoxide, N-methylpyrrolidone, dimethylacetamide, gamma-valerolactone, delta-valerolactone, epsilon-caprolactone, tributylphosphate, dimethylformamide, diglyme and benzonitrile, the axial base is selected from at least one of 1-methylimidazole, 2-methylimidazole, 1,2,-dimethylimidazole, dimethylsulfoxide, N,N'-diethylethylenediamine, 4-dimethylaminopyridine, 4-aminopyridine, 4,4-bipyridine, 4-methoxypyridine, 4-methylaminopyridine, 3,4-lutidine, 3,5-lutidine, pyridine, 4-methylpyridine, 4-cyanopyridine, pyrazine, 4-pyrrolidinopyridine and N-methylpyrazinium halides, and the oxygen carrier is selected from N,N'-bis(3-methoxysalicylidene)ethylenediaminecobalt(II), N,N'-bis(3-methoxysalicylidene)tetramethylethylenediaminecobalt(II), and

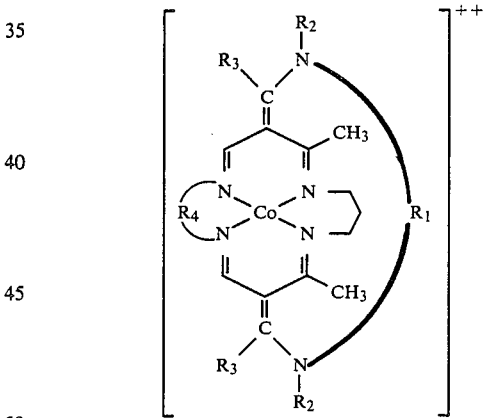

wherein
$R_1$ is a branched or straight-chain hydrocarbon or hetero-atom-containing bridge;
$R_2$ is hydrogen or methyl;
$R_3$ is methyl or benzyl; and
$R_4$ is alkyl containing 2 to 3 carbon atoms.

35. Apparatus for the separation and purification of oxygen and nitrogen comprising:
(a) membrane means,
(b) means for bringing atmospheric air into contact with said membrane means, said membrane means separating said atmospheric air into a feed stream on one side of said membrane means and a product stream on the other side of said membrane means,
(c) means for maintaining the oxygen partial pressure on the product-stream side of said membrane means at least approximately 10 mmHg lower than the oxygen partial pressure on the feed-stream side of said membrane means, (d) means for collecting oxygen from the product-stream side of said membrane means and nitrogen from the feed-stream side of said membrane means, (e) said membrane comprising a membrane support which is a nonporous polymeric film or a microporous polymeric film selected from polysulfones, polyamides, regenerated cellulose, polyhalogenated hydrocarbons, polyesters, polyurethanes, polyolefins, polycarbonates, polysachharides, polyorganosilanes, and polyorganosiloxanes, said membrane support containing a solvent or solvent mixture and a pentacoordinate oxygen carrier, said solvent or solvent mixture and pentacoordinate oxygen carrier being in the liquid phase when present together, said solvent or solvent mixture being capable of dissolving said pentacoordinate oxygen carrier, and said pentacoordinate oxygen carrier being a metal-containing complex having any of the structures

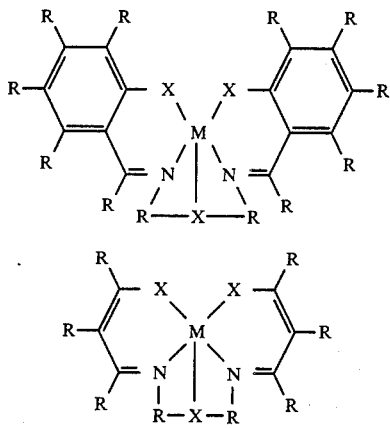

wherein
M is cobalt, iron, copper, nickel, manganese, ruthenium or rhodium;
X is —O—, —S—,

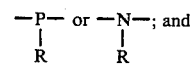

R is hydrogen, alkyl, aryl, halogen, alkoxy or a nitrogen-containing moiety.

36. The apparatus of claim 34 wherein the oxygen carrier is N,N'-bis(salicylideneimino)di-n-propylaminecobalt(II).

* * * * *